May 7, 1957 D. D. BEALE 2,791,248
PLATED SAW BLADE
Filed March 22, 1954
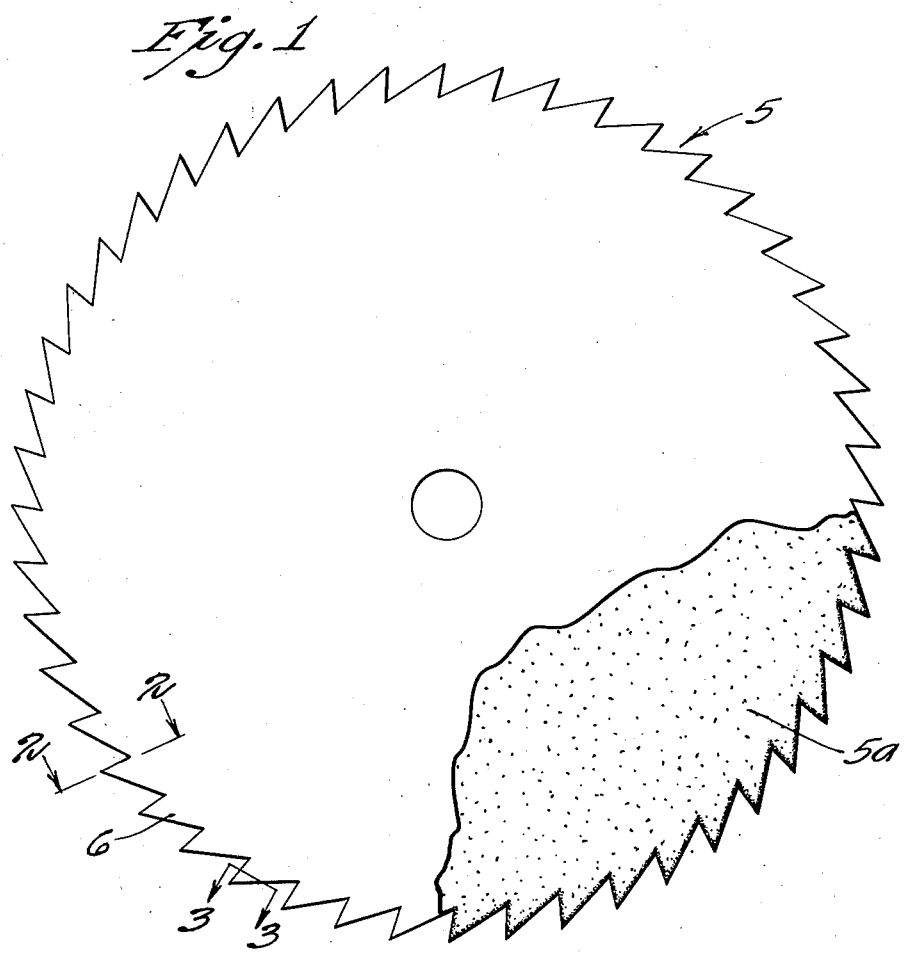
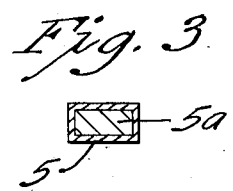
Inventor
Dorr D. Beale
By Williamson, Williamson, Schroeder & Adams
Attorneys

2,791,248

PLATED SAW BLADE

Dorr D. Beale, Minneapolis, Minn.

Application March 22, 1954, Serial No. 417,718

1 Claim. (Cl. 143—133)

This invention relates to a plated saw blade and the method of manufacturing the same.

Saw blades have, in the past, been made from high cost, nickel chrome alloy steel which usually requires that the teeth be milled in the cutting edge thereof or said blades are manufactured from mild, cold rolled steel and then heat treated. Experience has shown that, while the nickel chrome alloy blades stand up longer and are more durable as well as producing a cleaner cut, the same are extremely costly not only from the standpoint of the high cost of material but also from the standpoint of high manufacturing cost and working with an extremely hard steel product. Heat treated blades have a relatively low material cost, but the subsequent heat treating process produces distortion of the blades requiring subsequent straightening, and experience has shown that such blades are not sufficiently durable to produce satisfactory results, and the operating cost, particularly with power tools, is approximately the same as with the higher grade, more durable nickel chrome alloy steel blades.

It is an object of my invention to provide a saw blade particularly constructed to produce, for an extremely low cost, a toothed cutting edge of comparable durability, or even improved durability, over the extremely expensive, nickel chrome alloy steel blades.

It is another object to provide an extremely low cost, yet highly durable, saw blade constructed from mild steel with the teeth formed along the cutting edge thereof and having a plated layer of extremely hard, high density metallic material such as nickel chrome covering at least the entire exposed surface of the cutting edge portion of the blade.

It is another object to provide a method of manufacturing saw blades consisting in initially producing a saw blade having a toothed cutting edge and plating at least the marginal cutting edge portion of the blade with a layer of extremely hard and durable low friction material such as nickel chrome.

These and other objects and advantages of this invention will more fully appear from the following description made in connection with the accompanying drawings, wherein like reference characters refer to the same or similar parts throughout the several views, and in which:

Fig. 1 is a top plan view of a blade made in accordance with my invention;

Fig. 2 is a fragmentary vertical sectional view taken substantially along the line 2—2 of Fig. 1; and Fig. 3 is a fragmentary vertical sectional view taken substantially along the line 3—3 of Fig. 1.

In Fig. 1, a blade for a circle saw is illustrated with a portion of the plated layer broken away. The entire blade is designated by the numeral 5 and has a plurality of spaced teeth 6 formed in the outer cutting edge portion thereof around the periphery. Obviously, any desired tooth configuration may be used in producing the cutting edge. The main body of the blade 5 is shown in the broken-away portion of Fig. 1, as indicated at 5a, and is constructed of relatively inexpensive, mild steel which may be cold rolled but is otherwise untreated.

This relatively soft, inexpensive steel permits the use of a stamping operation for cutting the teeth therein and, being relatively soft, the cutting edge of the tooth may be sharply pointed by the stamping die without danger of crystallizing or breaking the same. After the configuration of the desired tooth shape is cut in the periphery of the saw blade to form the marginal cutting edge portion thereof, the teeth are set in the usual manner, as shown in Fig. 2, and thereafter the blade is plated with a layer of nickel chrome which, in the form shown, is applied to the entire outside surface of the blade, including the cutting edges, as is shown by the sectional views 2 and 3. This nickel chrome plating material is extremely hard and dense and is even more durable than the nickel chrome alloy blades previously described in the introductory paragraphs hereof. This plated layer not only produces an extremely durable and long-wearing low friction cutting edge, but also prevents rusting of the blade surface, which rusting materially increases the frictional resistance thereof during the cutting operation.

The ease of manufacture in stamping out and setting the relatively soft mild cold rolled steel, which I have found to be entirely satisfactory for this purpose, materially reduces not only the cost of the material used in such blades but also the labor cost required to produce the same. The chrome nickel plating process costs approximately the same as the heat treating process required in one of the conventional methods of manufacture, but produces a substantially better, smoother cutting, and more durable blade than is possible with heat treatment, and requires no straightening after the plating process which is often required after the heat treating process, therefore for approximately the same cost as the heat treated mild steel blades, I have produced a considerably improved saw blade which will never rust and which will therefore obviate the necessity of coating the blade with oil as is required with the heat treated mild steel blades formerly used.

It should be noted that a plated layer completely surrounds each tooth as shown in Figs. 2 and 3, so that the entire cutting edge is protected thereby. I have found that the plated layer of nickel chrome need be only two or three thousandths of an inch thick (.002) to produce highly satisfactory results which, as has been pointed out, are considerably improved over not only the heat treated mild steel blades previously used but also are more durable than the high grade, nickel chrome alloy blades which are many times more costly.

It will, of course, be understood that various changes may be made in the form, details, arrangement and proportions of the parts without departing from the scope of this invention which, generally stated, consists in the matter shown and described herein and set forth in the appended claim.

What I claim is:

An inexpensive saw blade particularly adapted for use with power saws comprising a cold rolled mild steel body having a marginal portion with teeth formed in the edge thereof with some of the teeth being set so that at least outer portions thereof extend to one side of the blade and with other teeth set so that at least outer portions thereof extend to the other side of the blade, said teeth having edge surfaces and said marginal portion having opposite side surfaces, and an enclosing sheath of nickel chrome plating completely encompassing said marginal portion and teeth and overlying the opposite side surfaces and edge surfaces thereof, whereby to protect from corrosion and wear, the work-engaging marginal portion and teeth.

References Cited in the file of this patent

UNITED STATES PATENTS

| | | |
|---|---|---|
| 199,308 | Nickerson | Jan. 15, 1878 |
| 1,631,212 | King | June 7, 1927 |
| 2,030,225 | Poeggel | Feb. 11, 1936 |
| 2,624,381 | Von Der Werth | Jan. 6, 1953 |

FOREIGN PATENTS

| | | |
|---|---|---|
| 471,578 | Germany | Feb. 14, 1929 |